United States Patent [19]
Kulkarni

[11] Patent Number: 6,054,514
[45] Date of Patent: Apr. 25, 2000

[54] ADDITIVES FOR ENHANCING CORROSION PROTECTION OF METALS

[75] Inventor: Vaman G. Kulkarni, Charlotte, N.C.

[73] Assignee: Americhem, Inc., Cuyahoga Falls, Ohio

[21] Appl. No.: 09/081,334

[22] Filed: May 19, 1998

Related U.S. Application Data

[60] Provisional application No. 60/047,203, May 20, 1997.

[51] Int. Cl.[7] ............................... C08K 5/15; B32B 15/08
[52] U.S. Cl. ............................................ 524/111; 428/461
[58] Field of Search ............................... 428/461; 524/111

[56] References Cited

U.S. PATENT DOCUMENTS

| | | | |
|---|---|---|---|
| 5,260,129 | 11/1993 | Scholl et al. | 428/336 |
| 5,658,649 | 8/1997 | Wrobleski et al. | 428/213 |
| 5,721,056 | 2/1998 | Wessling | 428/461 |

*Primary Examiner*—Kriellion Sanders
*Attorney, Agent, or Firm*—Renner, Kenner, Greive, Bobak, Taylor & Weber

[57] ABSTRACT

A corrosion inhibiting paint composition comprises from about 1 to 20 parts by weight of a corrosion inhibiting additive mixture comprising 1 to 25 parts by weight of an organic sulfonic acid in a mixture of 75 to 99 parts by weight of butyrolactone; from about 10 to 99 parts by weight of film forming polymer; and from about 0 to 89 parts by weight of a liquid medium selected from the group consisting of water, organic solvents for the film forming polymer and mixtures thereof. Another corrosion inhibiting paint composition comprises from about 1 to 20 parts by weight of a corrosion inhibiting additive mixture comprising 1 to 25 parts by weight of an organic sulfonic acid in a mixture of 75 to 99 parts by weight of butyrolactone; from about 10 to 98.5 parts by weight of film forming polymer; from about 0.5 to 20 parts of an intrinsically conductive polymer; and from about 0 to 89 parts of liquid medium selected from the group consisting of water and organic solvents for the film forming polymer and mixtures thereof. Metal substrates containing a coating composition comprise an organic film forming matrix and an additive mixture comprising organic sulfonic acid and butyrolactone. A method for imparting corrosion resistance to metal substrates comprises providing a layer of a coating composition on at least one surface of the substrate, formed from an organic film forming matrix and an additive mixture comprising an organic sulfonic acid and butyrolactone.

36 Claims, No Drawings

ADDITIVES FOR ENHANCING CORROSION PROTECTION OF METALS

CROSS-REFERENCE TO RELATED APPLICATIONS

This application claims the benefit of provisional application No. 60/047,203, filed May 20, 1997.

TECHNICAL FIELD

The present invention relates to corrosion protection of metals. Specifically, the invention relates to additives that enhance the corrosion protection offered by conventional organic coatings. More specifically, the invention relates to additives that enhance the corrosion protection of conductive polymer coatings. Metal substrates, protected from corrosion are provided based upon the use of coating compositions containing additives according to the present invention. A method for imparting corrosion protection to metal substrates is also provided.

BACKGROUND OF THE INVENTION

Metals are known to rust on exposure to moist environment. Organic coatings have long been used for corrosion protection due to their barrier properties. Coatings that provide active corrosion inhibition such as zinc rich coatings and chromates, phosphates and the like, have been the mainstay of the industry for many years. The zinc rich coatings provide cathodic protection, while the chromates and phosphates are believed to passivate the metal. Innumerable inorganic pigments and fillers have been so claimed to provide corrosion protection. Multiple coatings are often necessary to overcome non-uniformities and pin holes that are the source of corrosion in organic coatings. Growing concerns over the adverse toxicological properties of corrosion inhibiting pigments, has prompted the industry to look for alternatives. Intrinsically conductive polymers (ICPs) such as polyanalines offer such an alternative. The interest in ICPs as corrosion inhibitors is based on the following properties—ICPs passivate the metal by forming a protective oxide layer; ability of the conducting polymer coating to tolerate pin holes and scratches; and the redox chemistry, that provides for continuous repairing of the oxide layer in case of scratches and dents.

Intrinsically conductive polymers are a relatively new class of material. The use of ICPs for corrosion protection was proposed over a decade ago by A. G. MacDiarmid, Personal Communication at the Int. Conf. Synth. Metals, 1986, Kyoto, Japan. Since then several groups around the world have demonstrated the effectiveness of ICPs in corrosion inhibition of metals. The ICP technology is fundamentally different in its approach to corrosion prevention compared to conventional organic coatings, in that ICPs take part in the electrochemical corrosion reaction.

However, it was not until the early to mid-nineties that detailed investigation on corrosion protection by polyaniline coating was conducted. All of the previous disclosures and references of the potential use of conjugated polymers refer to the use of continuous of conductive coating by electrochemical polymerization directly on the metal surface. Thompson et al (K. G. Thompson, D. J. Bryan, B. C. Benicewicz, D. A. Wrobleski, Los Alamos National Laboratory Report LA-UR-92-360) reported that mild steel coupons coated with continuous coating of neat solutions of polyaniline in 1-methyl-2-pyrrolidone provided significant corrosion inhibition in 3.5% sodium chloride and 0.1M hydrochloric acid solutions. Wessling (Adv. Mater., 6(1994) 226) was the first to report passivation of metals using dispersions of polyaniline. Polyaniline was deposited from pure polyaniline dispersions on metallic samples. The dip coating procedure was repeated 5–20 times to provide thicker coatings. Wessling observed a significant positive shift in corrosion potential along with reduction in corrosion current. Upon removal of the polyaniline coating, Wessling also observed change in appearance and the presence of passivated layer was confirmed.

Lu et al., (Lu. W. K. Elsenbaumer. R. L., and B. Wessling, SYNATH. MET. 71(1995) 2163, and Wei-Kang Lu, Sanjoy Basak and Ronald L. Elsenbaumer. "Corrosion Inhibition of Metals by Conductive Polymers" HANDBOOK OF CONDUCTING POLYMERS, edited by Terje A. Skotheim, Ronald L. Elsenbaumer and John R. Renyolds, Marcell Dekker (1998), reported corrosion protection of mild steel in acidic and saline atmosphere using neutral and doped polyaniline coatings, with a epoxy top coat. Neutral polyaniline was applied from NMP solutions, which were further doped with p-toluene sulfonic acid. Both the neutral and doped polyanilines showed corrosion protection. Corrosion protection provided by doped polyaniline was more significant in acid conditions than saline conditions. Very recently, Sitaram et al (S. P. Sitaram, J. O. Stoffer and T. J. O'Keefe, Journal of Coatings Technology, 69(866), 1997,65) have reported corrosion protection of untreated steel using Versicon, a doped polyaniline, neutral polyaniline and PANDA, a soluble form of polyaniline manufactured by Monsanto. They reported PANDA exhibited significant improvement in corrosion protection, when used as a base coat, with a conventional top coat. It was interesting to note that both Versicon and PANDA did not exhibit significant protection, when formulated in to conventional coatings such as epoxy or acrylics. They concluded that polyaniline/PANDA does not function as a pigment.

In summary, conductive polymers, especially polyanilines have been shown to provide corrosion protection to steel. However, there is discrepancy as to the extent of corrosion protection and the effect of the form of the polyaniline and the nature of corrosion environment. Electrochemical techniques are not suitable for many industrial applications. The level of corrosion protection of chemically prepared polyaniline seems to be extremely dependent on the formulation and is unreliable. While Wessling reports passivation of metals using polyaniline dispersions and blends, Sitaram et al have disclosed that blends of polyaniline with conventional resins, were less effective than neat coatings. Further, commercial application of ICPs is hampered by commercial non-availability and the cost of these materials.

Commercial application of ICP materials is hampered by their processability, commercial availability and the cost of these materials. Their effectiveness in corrosion inhibition is dependent on the chemistry and the method of preparation. Results vary considerably with the method of preparation.

Therefore there remains a need for corrosion inhibitive coatings that can overcome the adverse toxicological properties of corrosion inhibiting pigments, such as the chromates, and overcome the processing and cost disadvantages of inherently conductive polymers and which can provide consistent corrosion protection.

Corrosion protective coatings based on intrinsically conductive polymers (ICP's) can have a wide range of commercial applications such as bridges, rebars used in concrete, underground storage tanks, ships, oceanic drilling platform equipment, automotive and several industrial machinery, equipment and metal furniture. In order for polyaniline and other ICP's to be successful commercially in corrosion prevention, it is apparent that they need to be applied as coatings using practical techniques. Further, these coatings need to be environmentally attractive. In addition to processability of ICP's, the coatings must provide excellent adhesion to the substrate metal, be durable and environmentally stable in certain applications. Thus, there is a clear need for a ICP coating formulated to offer the properties described above that can provide enhanced corrosion protection.

SUMMARY OF INVENTION

It is therefore an object of the present invention to provide an additive mixture that enhances the corrosion inhibiting properties of organic coatings.

It is a further object of the present invention to provide corrosion inhibiting paint compositions based on an intrinsically conductive polymer and comprising an organic sulfonic acid and butyrolactone as additives.

It is another object of the present invention to provide a coating composition that utilizes butyrolactone and an organic sulfonic acid to impart corrosion protection, based upon the synergistic effect of the two.

It is yet another object of the present invention to provide corrosion protected metal substrates.

It is still another object of the present invention to provide a method for providing corrosion protection to metal substrates.

In general, the present invention provides a corrosion inhibiting paint composition comprising from about 1 to 20 parts by weight of a corrosion inhibiting additive mixture comprising 1 to 25 parts by weight of an organic sulfonic acid in a mixture of 75 to 99 parts by weight of butyrolactone; from about 10 to 99 parts by weight of film forming polymer; and from about 0 to 89 parts by weight of a liquid medium selected from the group consisting of water, organic solvents for the film forming polymer and mixtures thereof.

The invention also provides a corrosion inhibiting paint composition comprising from about 1 to 20 parts by weight of a corrosion inhibiting additive mixture comprising 1 to 25 parts by weight of an organic sulfonic acid in a mixture of 75 to 99 parts by weight of butyrolactone; from about 10 to 98.5 parts by weight of film forming polymer; from about 0.5 to 20 parts of an intrinsically conductive polymer; and from about 0 to 89 parts of liquid medium selected from the group consisting of water and organic solvents for the film forming polymer and mixtures thereof.

The invention also provides metal substrates containing a coating composition comprising an organic film forming matrix and an additive mixture comprising organic sulfonic acid and butyrolactone.

The invention further provides a method for imparting corrosion resistance to metal substrates comprising providing a layer of a coating composition on at least one surface of the substrate, formed from an organic film forming matrix and an additive mixture comprising an organic sulfonic acid and butyrolactone.

PREFERRED EMBODIMENT FOR CARRYING OUT THE INVENTION

The corrosion inhibitive composition of this comprises two components. One of the components is a corrosion inhibiting additive mixture. The additive mixture comprises from 1 to 25 parts by weight of an organic sulfonic acid and from 75 to 99 parts by weight butyrolactone. The additive mixture can be used by itself as a wash primer or in a coating composition. When used as a part of the coating composition, the amount of the additive mixture is from 1 to 20 parts by weight. While butyrolactone is the preferred solvent, other lactones and highly polar organic solvents and other materials can be used. The organic sulfonic acids that can be used include polystyrene sulfonic acid, dodecylbenzene sulfonic acid, methane sulfonic acid, naphthalene sulfonic acids and the like, with polymeric acids being preferred and particularly polystyrene sulfonic acid. Other organic acids such as carboxylic acids may also be useful since they may be able to anchor to the metal substrate.

During previous work on conductive coatings, U.S. Pat. No. 5,494,609 and work on water reducible ESD (electrostatically dissipative) coatings it was unexpectedly found that certain coating compositions and additives caused the processing equipment (steel) to turn gray. These coating formulations and additives were tested for corrosion inhibition by immersion and outdoor exposure and showed exceptional protection. Particularly, the two additives—butyrolactone and polystyrene sulfonic acid—showed synergistic effect and provided enhanced corrosion protection.

The second component is the film forming polymer matrix. Useful film forming polymer matrices include solution processible polymers, thermoset polymers, water soluble and water dispersible polymers and monomers, oligomers and polymers curable by heat, light, x-rays, gamma rays, microwave radiation, UV and infrared radiation, corona discharge, electron beams and the like. Illustrative of the film forming polymers according to the present invention are the acrylics, polyesters, epoxies, urethanes, vinyls, styrenics, polyamides and polymer mixtures and copolymers thereof. Other useful polymers are those cited above that are additionally functionalized with various groups that alter the processability, solubility, surface tension and other physical properties of the matrix. Representative groups are copolyester, acrylate and hydroxy functional acrylates, epoxies including two component epoxies, phenoxy polymers and the like.

The film forming polymer may be dissolved or dispersed in a liquid medium, such as an organic solvent or water. Useful solvents include aromatic, aliphatic and functionalized aromatic and aliphatic solvents. When water is used as the solvent or the dispersing media, conventional additives dispersing solubilizing agents are used.

The presents invention also provides for a paint composition comprising from 1 to 20 parts by weight of an additive mixture in combination with conventional corrosion inhibiting inorganic and organic additives. The film forming polymer comprises from about 10 to 99 parts by weight of the paint composition and from 0 to 89 parts by weight of the liquid medium can be added, so as to provide 100 total parts by weight.

The present invention also provides for enhancing the corrosion inhibitive properties of the coatings by use of intrinsically conductive polymers as additives. The intrinsically conductive polymer, in neutral or conductive form, provides a site for the additive mixture, specifically, the organic acid, to anchor and provide enhanced corrosion protection. Intrinsically conductive polymers are described in my earlier U.S. Pat. Nos. 5,217,649, 5,290,483, 5,494,609, 5,595,689 and 5,648,416, the subject matter of which are incorporated herein by reference. One particularly useful polymer is polyaniline or its derivatives, which can be employed in any form. As is also known, the polyanilines can be polymerized onto various substrates such as minerals, carbon black, glass spheres, fibers and the like.

The amount of ICP in the coating composition is from about 0.5 to 20 parts by weight, combined with about 1 to 20 parts by weight of the corrosion inhibiting additive mixture, about 10 to 99 parts by weight of the film forming polymer and, about 0 to 89 parts by weight of the liquid medium, so as to total 100 parts by weight.

Suitable coatings for metal substrates have thicknesses of at least 0.1 mils. The coatings can be applied via conventional means known in the art such as spraying, dipping, brushing, and the like. After the coating is applied, it is cured by heat or radiation or simply by air drying. Metal substrates that can be coated and protected include iron, copper, titanium, chromium, aluminum, tantalum, niobium and silicon.

In addition to the principal components, the compositions of this invention can include other optional components, the nature of which can vary widely, including those materials which are known to those of skill in the art for inclusion in corrosion inhibitive coatings. Such materials may be present that alter the physical or mechanical properties of the coating solutions and coatings cast from the solutions. Materials may also be present which either fill or form a substrate from the conductive coatings cast from solution. Illustrative of useful optional materials include reinforcing fillers, processing aids, crosslinking aids, plasticizers, blowing agents, lubricants, surfactants, texturants, colorants, pigments, minerals, clays, micas, fumed silicas, flame retardants, glass fibers, glass activated spheres, activated carbon, carbon fibers, iron oxides, barium metaborate, wollastonite, zinc phosphate, aluminum tripolyphosphate and mixtures thereof. When the dispersion contains such additives, the amount of the film forming matrix is reduced by the amount corresponding to the amount of the additive.

General Experimental

In order to demonstrate practice of the present invention, several examples are provided hereinbelow. It is to be understood that the compositions and the results reported are not to be construed as limiting practice of the present invention, rather that they have been provided to illustrate various working embodiments.

EXAMPLE 1

Coating compositions containing 22% by weight non-ionic self cross linking acrylic emulsion (Rhoplex HA-16 from Rohm and Hass) 0 to 5% by weight polystyrene sulfonic acid (PSSA, Versa TL 72, from National Starch) and 0 to 15% by weight of Butyrolactone (GBL, Aldrich Chemicals) and combinations of the two, were prepared as shown in Table I. The coatings were sprayed onto cold rolled steel (Q-panels, R35) and top coated with an acrylic high gloss top coat from ICI Devoe. The samples were tested for adhesion using ASTM D3359. Primer adhesion was rated and recorded between the values of 1B to 5B, with 5B being the best. Three steel coupons were tested for corrosion resistance by immersing in 3.5% by weight salt solution for 6 days (ASTM D1654).

At the end of 6 days, samples were removed and evaluated for scribed rust and unscribed rust according to ASTM D1654 and D610 respectively. The color of the salt bath was also noted, which indicates the extent of corrosion. Iron hydroxide formed as a result of corrosion can be seen as reddish colored suspension. A clear (uncolored) salt bath was given a rating of 10 and dark red colored salt bath was given a rating of 0. (10 is best and 0 is worst). Scribed and unscribed rust was also rated and recorded between the values of 0 and 10, with 10 being the best equivalent to no rust. The values presented in Table I represent an average of the values for the presence of PSSA, GBL and both in HA-16.

TABLE I

CORROSION INHIBITING COMPOSITIONS

| Sample No. | Composition | Primer Adhesion | Color of Salt Bath | Scribed Rust | Unscribed Rust |
|---|---|---|---|---|---|
| 1 | HA-16, neat | 5B | 4 | 7 | 3 |
| 2 | HA-16, PSSA | 5B | 3 | 6 | 2 |
| 3 | HA-16, GBL | 5B | 2 | 9 | 1 |
| 4 | HA-16, PSSA, GBL | 5B | 4 | 7 | 7 |

Sample No. 1, the neat HA-16 sample showed fair scribed rust (7) rating and rather poor unscribed rust rating (3). The coating containing polystyrene sulfonic acid (PSSA), Sample No. 2, showed no improvement, while the butyrolactone sample (GBL) Sample No. 3, showed improved scribed rust rating at the expense of unscribed rust. The sample containing both additives (PSSA and GBL), Sample No. 4, showed a dramatic improvement in unscribed rust (7 as compared to 1 to 3) protection, while maintaining the scribed rust protection, demonstrating the synergistic combination of the two according to the present invention. Significantly, corrosion resistance was improved even though the compositions did not contain any intrinsically conductive polymers.

EXAMPLE 2

Coating samples similar to example 1, but containing 5% by weight polyaniline as an intrinsically conductive polymer, were prepared and tested according to example 1. The results are shown in Table II.

TABLE II

CORROSION INHIBITING COMPOSITIONS CONTAINING POLYANILINE

| Sample | Composition | Primer Adhesion | Color of Salt Bath | Scribed Rust | Unscribed Rust |
|---|---|---|---|---|---|
| 5 | HA-16, PANI | 4B | 4 | 8 | 1 |
| 6 | HA-16, PANI, PSSA | 5B | 7 | 6 | 1 |
| 7 | HA-16, PANI, GBL | 3B | 6 | 7 | 2 |
| 8 | HA-16, PANI, PSSA AND GBL | 5B | 10 | 9 | 10 |

For Sample No. 5, Polyaniline (PANI) dispersed in HA-16 showed fair scribed rust protection and rather poor unscribed rust protection. Although not reflected in the scribed and unscribed rust ratings, addition of butyrolactone (GBL) or polystyrene sulfonic acid (PSSA) individually, Samples No. 6, and No. 7, respectively did provide improvement in corrosion inhibition efficiency, as indicated by lighter color of the salt bath. On the contrary, the sample containing butyrolactone and polystyrene sulfonic acid, Sample No. 8, showed a dramatic improvement in corrosion protection, both in terms of scribed rust and unscribed rust, again showing the synergistic effect of butyrolactone and polystyrene sulfonic acid in enhancing the corrosion protection offered by polyaniline. The salt bath was nearly colorless indicating minimal rust activity was taking place. Polystyrene sulfonic acid appeared to enhance adhesion of the coating to metal substrate.

EXAMPLE 3

10 parts of Versicon, a doped polyaniline, was dispersed in a mixture of 30 parts of a resin solution comprising 30 parts of TL-72 (18% by weight solution of polystyrene sulfonic acid); 55 parts each of gamma butyrolactone and water. Next 50 parts of a non-ionic self cross linking acrylic emulsion (Rhoplex HA-16 from Rohm and Hass) was added to the mixture with stirring.

The coating was applied to steel coupons after preparation and force dried at 80° C. for 1 hour. After cooling, a section of the coating was removed. The substrate had a silver gray appearance and looked substantially different compared to an untreated sample. The samples were exposed to outdoor weather for 4 days. The panels showed negligible corrosion compared to the untreated sample. It was surprising to note that even the portion in which the coating was removed also exhibited negligible corrosion.

EXAMPLE 4

A composition containing 4.3 parts of a polyaniline dispersion comprising 40% by weight doped polyaniline, was dispersed in 46 parts of hydroxy functional acrylate coating, containing an internal amine crosslinker; 48.7 parts of xylene and 1 part of dodecyl benzene sulfonic acid. The sample was coated on steel coupons and top coated with a two component epoxy. The sample showed significant corrosion protection compared to the same containing neutral and doped polyaniline without dodecyl benzene sulfonic acid.

Thus, it should be evident that the use of organic sulfonic acids in combination with butyrolactone, as a corrosion inhibiting additive mixture, added to film forming materials, is highly effective in providing corrosion inhibiting primers, paints and coatings. Additionally, the corrosion inhibition can be improved in primer compositions also comprising intrinsically conductive polymers, according to the present invention.

Based upon the foregoing disclosure, it should now be apparent that the use of the additives described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, organic sulfonic acids according to the present invention are not necessarily limited to those exemplified herein; nor, is the present invention limited to specific film forming polymers or amounts of the foregoing components. Thus, the scope of the invention shall include all modifications and variations that may fall within the scope of the attached claims.

What is claimed is:

1. A corrosion inhibiting paint composition comprising:
   (a) from about 1 to 20 parts by weight of a corrosion inhibiting additive mixture comprising 1 to 25 parts by weight of an organic sulfonic acid in a mixture of 75 to 99 parts by weight of butyrolactone;
   (b) from about 10 to 99 parts by weight of film forming polymer selected from the group consisting of polymers, oligomers and monomers of acrylics, polyesters, epoxies, urethanes, vinyls, styrenics, polyamides, phenoxys, alkyds, and mixtures thereof and polymers thereof that alter at least one of the processibility, solubility, surface tension and physical property of the polymer; and
   (c) from about 0 to 89 parts by weight of a liquid medium selected from the group consisting of water, organic solvents for said film forming polymer and mixtures thereof.

2. A corrosion inhibiting paint composition, as set forth in claim 1, wherein said organic sulfonic acid is polymeric in nature.

3. A corrosion inhibiting paint composition, as set forth in claim 2, wherein said organic sulfonic acid is polystyrene sulfonic acid.

4. A corrosion inhibiting paint composition, as set forth in claims 1, 2 or 3, which additionally comprise reinforcing fillers, processing aids, crosslinking aids, plasticizers, blowing agents, lubricants, surfactants, texturants, colorants, pigments, minerals, clays, micas, fumed silicas, flame retardants, glass fibers, glass activated spheres, activated carbon, carbon fibers, iron oxides, barium metaborate, wollastonite, zinc phosphate, aluminum tripolyphosphate and mixtures thereof.

5. A corrosion inhibiting paint composition comprising:
   (a) from about 1 to 20 parts by weight of a corrosion inhibiting additive mixture comprising 1 to 25 parts by weight of an organic sulfonic acid in a mixture of 75 to 99 parts by weight of butyrolactone;
   (b) from about 10 to 98.5 parts by weight of film forming polymer selected from the group consisting of polymers, oligomers and monomers of acrylics, polyesters, epoxies, urethanes, vinyls, styrenics, polyamides, phenoxys, alkyds, and mixtures thereof and polymers thereof that alter at least one of the processibility, solubility, surface tension and physical property of the polymer;
   (c) from about 0.5 to 20 parts by weight of an intrinsically conductive polymer; and
   (d) from about 0 to 89 parts by weight of a liquid medium selected from the group consisting of water, organic solvents for said film forming polymer and mixtures thereof.

6. A corrosion inhibiting paint composition, as set forth in claim 5, wherein said organic sulfonic acid is polymeric in nature.

7. A corrosion inhibiting paint composition, as set forth in claim 6, wherein said organic sulfonic acid is polystyrene sulfonic acid.

8. A corrosion inhibiting paint composition, as set forth in claims 5, 6 or 7, which additionally comprise reinforcing fillers, processing aids, crosslinking aids, plasticizers, blowing agents, lubricants, surfactants, texturants, colorants, pigments, minerals, clays, micas, fumed silicas, flame retardants, glass fibers, glass activated spheres, activated carbon, carbon fibers, iron oxides, barium metaborate, wollastonite, zinc phosphate, aluminum tripolyphosphate and mixtures thereof.

9. A corrosion inhibiting paint composition, as set forth in claim 5, wherein said intrinsically conductive polymer comprises polyaniline or a derivative thereof.

10. A corrosion inhibiting paint composition, as set forth in claim 9, wherein polyaniline can be in any form.

11. Metal substrates containing a coating composition comprising an organic film forming matrix selected from the group consisting of polymers oligomers or monomers of acrylics, polyesters, epoxies, urethanes, vinyls, styrenics, polyamides, phenoxys, alkyds, and mixtures thereof and polymers thereof that alter at least one of the processibility, solubility, surface tension and physical property of the polymer, and an additive mixture comprising an organic sulfonic acid and butyrolactone.

12. Metal substrates, as set forth in claim 11, wherein said additive mixture is a corrosion inhibiting additive mixture comprising 1 to 25 parts by weight of said organic sulfonic acid and 75 to 99 parts by weight of said butyrolactone; and wherein said coating composition comprises:
   (a) from about 1 to 20 parts by weight of said corrosion inhibiting additive mixture;
   (b) from about 10 to 99 parts by weight of said organic film forming matrix; and
   (c) from about 0 to 89 parts by weight of a liquid medium selected from the group consisting of water, organic solvents for said film forming matrix and mixtures thereof.

13. Metal substrates, as set forth in claim 12, wherein said organic sulfonic acid is polymeric in nature.

14. Metal substrates, as set forth in claim 13, wherein said organic sulfonic acid is polystyrene sulfonic acid.

15. Metal substrates, as set forth in claims 11, 12, or 13, which additionally comprise reinforcing fillers, processing aids, crosslinking aids, plasticizers, blowing agents, lubricants, surfactants, texturants, colorants, pigments, minerals, clays, micas, fumed silicas, flame retardants, glass fibers, glass activated spheres, activated carbon, carbon fibers, iron oxides, barium metaborate, wollastonite, zinc phosphate, aluminum tripolyphosphate and mixtures thereof.

16. Metal substrates, as set forth in claim 12, having a coating thickness of at least about 0.1 mil, wherein said coated metal substrate exhibits reduced corrosion compared to said metal substrate coated with a composition consisting essentially of said film forming matrix.

17. Metal substrates, as set forth in claim 11, wherein said metal substrate comprises one or more metals selected from the group consisting of iron, copper, titanium, chromium, aluminum, tantalum, niobium, and silicon.

18. Metal substrates, as set forth in claim 11, wherein said additive mixture is a corrosion inhibiting additive mixture comprising 1 to 25 parts by weight of said organic sulfonic acid and 75 to 99 parts by weight of said butyrolactone; and wherein said coating composition comprises:
   (a) from about 1 to 20 parts by weight of said corrosion inhibiting additive mixture;
   (b) from about 10 to 98.5 parts by weight of said organic film forming matrix;
   (c) from about 0.5 to 20 parts by weight of an intrinsically conductive polymer; and
   (d) from about 0 to 89 parts by weight of a liquid medium selected from the group consisting of water, organic solvents for said film forming matrix and mixtures thereof.

19. Metal substrates, as set forth in claim 18, wherein said organic sulfonic acid is polymeric in nature.

20. Metal substrates, as set forth in claim 19, wherein said organic sulfonic acid is polystyrene sulfonic acid.

21. Metal substrates, as set forth in claims 18, 19 or 20, which additionally comprise reinforcing fillers, processing aids, crosslinking aids, plasticizers, blowing agents, lubricants, surfactants, texturants, colorants, pigments, minerals, clays, micas, fumed silicas, flame retardants, glass fibers, glass activated spheres, activated carbon, carbon fibers, iron oxides, barium metaborate, wollastonite, zinc phosphate, aluminum tripolyphosphate and mixtures thereof.

22. Metal substrates, as set forth in claim 18, said coating having a thickness of at least about 0.1 mil, wherein said coated metal substrate exhibits reduced corrosion compared to said metal substrate coated with a composition consisting essentially of said film forming matrix.

23. Metal substrates, as set forth in claim 18, wherein said metal substrate comprises one or more metals selected from the group consisting of iron, copper, titanium, chromium, aluminum, tantalum, niobium, and silicon.

24. A method for imparting corrosion resistance to metal substrates comprising providing a layer of a coating composition on at least one surface of said substrate, said coating composition formed from an organic film forming matrix selected from the group consisting of polymers oligomers or monomers of acrylics, polyesters, epoxies, urethanes, vinyls, styrenics, polyamides, phenoxys, alkyds, and mixtures thereof and polymers thereof that alter at least one of the processibility, solubility, surface tension and physical property of the polymer, and a corrosion inhibiting additive mixture comprising an organic sulfonic acid and butyrolactone.

25. A method, as set forth in claim 24, wherein said coating composition comprises:
   (a) from about 1 to 20 parts by weight of said corrosion inhibiting additive mixture comprising 1 to 25 parts by weight of said organic sulfonic acid and 75 to 99 parts by weight of said butyrolactone;
   (b) from about 10 to 99 parts by weight of said film forming matrix; and
   (c) from about 0 to 89 parts by weight of a liquid medium selected from the group consisting of water, organic solvents for said film forming matrix and mixtures thereof.

26. A method, as set forth in claim 25, wherein said organic sulfonic acid is polymeric in nature.

27. A method, as set forth in claim 26, wherein said organic sulfonic acid is polystyrene sulfonic acid.

28. A method, as set forth in claims 24, 25 or 26, which additionally comprise reinforcing fillers, processing aids, crosslinking aids, plasticizers, blowing agents, lubricants, surfactants, texturants, colorants, pigments, minerals, clays, micas, fumed silicas, flame retardants, glass fibers, glass activated spheres, activated carbon, carbon fibers, iron oxides, barium metaborate, wollastonite, zinc phosphate, aluminum tripolyphosphate and mixtures thereof.

29. A method, as set forth in claim 24, wherein said coating is at least about 0.1 mil thick, and said coated metal substrate exhibits reduced corrosion compared to said metal substrate coated with a composition consisting essentially of said film forming matrix.

30. A method, as set forth in claim 24, wherein said metal substrate comprises one or more metals selected from the group consisting of iron, copper, titanium, chromium, aluminum, tantalum, niobium, and silicon.

31. A method, as set forth in claim 24, wherein said coating composition comprises:
   (a) from about 1 to 20 parts by weight of said corrosion inhibiting additive mixture comprising 1 to 25 parts by weight of said organic sulfonic acid and 75 to 99 parts by weight of said butyrolactone;
   (b) from about 10 to 98.5 parts by weight of said film forming matrix; and
   (c) from about 0.5 to 20 parts by weight of an intrinsically conductive polymer; and
   (d) from about 0 to 89 parts by weight of a liquid medium selected from the group consisting of water, organic solvents for said film forming matrix and mixtures thereof.

32. A method, as set forth in claim 31, wherein said organic sulfonic acid is polymeric in nature.

33. A method, as set forth in claim 32, wherein said organic sulfonic acid is polystyrene sulfonic acid.

34. A method, as set forth in claims 31, 32 or 33, which additionally comprise reinforcing fillers, processing aids, crosslinking aids, plasticizers, blowing agents, lubricants, surfactants, texturants, colorants, pigments, minerals, clays, micas, fumed silicas, flame retardants, glass fibers, glass activated spheres, activated carbon, carbon fibers, iron oxides, barium metaborate, wollastonite, zinc phosphate, aluminum tripolyphosphate and mixtures thereof.

35. A method, as set forth in claim 31, wherein said coating is at least about 0.1 mil thick, and said coated metal substrate exhibits reduced corrosion compared to said metal substrate coated with a composition consisting essentially of said film forming matrix.

36. A method, as set forth in claim 31, wherein said metal substrate comprises one or more metals selected from the group consisting of iron, copper, titanium, chromium, aluminum, tantalum, niobium, and silicon.

* * * * *